(12) United States Patent
Andersen et al.

(10) Patent No.: US 6,432,464 B1
(45) Date of Patent: Aug. 13, 2002

(54) SYNERGISTIC COMBINATION OF SWEETENERS INCLUDING D-TAGATOSE

(75) Inventors: Henrik Andersen; Mads L. Vigh, both of Viby J. (DK)

(73) Assignee: Arla Foods Amba, Viby J. (DK)

( * ) Notice: Subject to any disclaimer, the term of this patent is extended or adjusted under 35 U.S.C. 154(b) by 0 days.

(21) Appl. No.: 09/227,084

(22) Filed: Jan. 5, 1999

Related U.S. Application Data

(60) Provisional application No. 60/070,480, filed on Jan. 5, 1998.

(51) Int. Cl.$^7$ ................................................ A23L 1/236
(52) U.S. Cl. ...................... 426/548; 426/590; 426/658
(58) Field of Search ................................. 426/548, 590, 426/591, 599, 658

(56) References Cited

U.S. PATENT DOCUMENTS

| | | | |
|---|---|---|---|
| 4,786,722 A | * 11/1988 | Zehner | 426/658 |
| 5,002,612 A | 3/1991 | Beadle et al. | |
| 5,078,796 A | 1/1992 | Beadle et al. | |
| 5,356,879 A | 10/1994 | Zehner et al. | |
| 5,447,917 A | 9/1995 | Zehner et al. | |

OTHER PUBLICATIONS

Gelardi, Robert C., The Multiple Sweetener Approach and New Sweeteners on the Horizon, Food Technology, Jan. 1987, pp. 123–124.*

* cited by examiner

Primary Examiner—Leslie Wong
(74) Attorney, Agent, or Firm—Finnegan, Henderson, Farabow, Garrett & Dunner, L.L.P.

(57) ABSTRACT

D-tagatose is used to synergize the effect of potent sweeteners. When combined with one or more potent sweeteners, it is able to effect improvements in sensory characteristics such as mouthfeel, flavor and aftertaste of a sweetened product.

10 Claims, No Drawings

SYNERGISTIC COMBINATION OF SWEETENERS INCLUDING D-TAGATOSE

This application claims the benefit of Provisional Application No. 60/070,480, filed Jan. 5, 1998.

BACKGROUND OF THE INVENTION

This invention relates to synergistic combinations of sweeteners including D-tagatose for use in beverage and food formulations. D-tagatose, in even very small amounts, is a powerfull synergizer for potent sweeteners. Further, it is able to effect improvements in the quality of taste of the edible products in which it is used.

D-tagatose is a well-known keto-hexose which is useful as a reduced calorie food sweetening and bulking agent, and as an additive in detergent, cosmetic and pharmaceutical formulations. U.S. Pat. Nos. 5,002,612 and 5,078,796 to Beadle et al. teach processes of making D-tagatose by isomerizing a mixture containing D-galactose with a metal hydroxide in the presence of a catalyst at a relatively low temperature to form an intermediate complex, followed by neutralizing with acid to yield D-tagatose.

D-tagatose is known as an anti-hyperglycemic agent that can be used to inhibit formation of advanced glycosylation in products in mammals as described in U.S. Pat. Nos. 5,356,879 and 5,447,917 to Zehner et al. D-tagatose also is known as a low-calorie carbohydrate sweetener, and bulking agent that can be used in the preparation of sweetened edible formulations as taught in U.S. Pat. No. 4,786,722 to Zehner. Specifically, D-tagatose has been suggested as the sole sweetening agent, or in combination with conventionally used sweetening agents, e.g., a combination with a minor amount of sucrose. Furthermore, it has been proposed to use D-tagatose as a bulking and sweetening agent in combination with an intensive sweetener such as aspartame or saccharin. If D-tagatose were used as the only sweetener for edible products, its use levels will never be in the 5% range, probably rarely under 8% and often 10% or more. If D-tagatose were used as a bulking agent for low calorie sweeteners, the use level will be over 15% in bakery products and frozen dairy products, more than 20% for chocolate and 50% for candies. U.S. Pat. No. 4,786,722 does not teach the use of D-tagatose for the sensory impact it has on potent sweeteners.

The use of low calorie sweeteners, such as potent sweeteners, in a variety of food products is common place in food and beverage formulations. For many consumers, however, products marketed as diet or light versions of products that are artificially sweetened are not preferred. Attempts have been made over the years to improve the taste delivery of these diet or light products through the addition of small quantities of carbohydrates. Diet beverages may, on occasion, contain small quantities of fructose added to improve the taste delivery. These products generally contain approximately 1 percent fructose. Other products, particularly in Japan, may contain erythritol as an additive to improve other qualities of the food or beverage product beyond its sweetness. For example, other sensory characteristics of a food or beverage product include the flavor, mouthfeel and aftertaste of the product. Efforts have been made to add specific small molecular weight carbohydrates to diet or light beverages in an attempt to improve the sensory delivery.

One of the sensory limitations of 'diet'/'light' beverages often expressed by consumers is the lack of 'body' or 'mouthfeel' that they deliver relative to their 'regular', sugar/high fructose syrup, sweetened equivalents. The full calorie products are perceived as having a full, syrupy, smooth mouthfeel. Diet products are often described as being thin and 'watery'. In attempting to overcome this deficiency, some formulated flavors are commercially available which are said to deliver a more sucrose like taste profile to diet beverages, and some sweeteners, particularly neohesperidin dihydrochalcone and the sweet protein thaumatin are said to deliver enhanced mouthfeel at low addition levels.

Efforts are continuing to identify a low-calorie sweetener to deliver sucrose-identical sensory characteristics in edible food products, and particularly with respect to beverages. Low-calorie potent sweeteners generally permit the development of diet or light products through an ability to elicit sufficient sweetness at a very low concentration of the sweetener, but they are generally unable to mimic other sensory characteristics of sucrose, particularly mouthfeel/body. In addition, artificial sweeteners to date have not been able to deliver the full, rounded, sweetness typical of sucrose and other small molecular weight carbohydrates. Accordingly, there is a continuing need to identify a low-calorie sweetener that provides both the sweetness characteristics of sucrose and other important sensory characteristics such as mouthfeel, flavor, and aftertaste.

SUMMARY OF THE INVENTION

It has now been found that D-tagatose is not only able to effect improvements in the quality of food and beverage formulations, particularly in diet/light beverages, but that its use is synergistic with potent sweeteners. The synergistic effect of D-tagatose with potent sweeteners is present even at very low addition rates. The use of D-tagatose is able to replace significant quantities of potent sweeteners, even when it is added at concentrations well below its measured sweet taste threshold.

Not only does the use of D-tagatose have benefits in diet or light beverages from a synergy standpoint, other important qualitative benefits from the use of D-tagatose can be realized in these types of products. Subtle, but consistent, benefits have been observed through the use of D-tagatose with respect to flavor, aftertaste, and mouthfeel of beverages containing as little as 0.2% D-tagatose.

The benefits of the use of D-tagatose with one or more potent sweeteners can be realized with concentrations of D-tagatose of about 0.01 to about 5% weight/volume based on the total composition. The amount of potent sweetener in the total composition will typically range from about 5 ppm to about 4000 ppm (mg./kg. of total composition) depending on the sweetener used. The weight ratio of D-tagatose to potent sweetener in the sweetener composition according to the present invention ranges from 1:5 to 10,000:1. The particular ratio selected is dependent on the potent sweetener (s) used and the desired level of sweetness and other sensory characteristics. The use of D-tagatose also has been shown to provide benefits as a component in table-top sweetener formulations containing a potent sweetener.

DETAILED DESCRIPTION OF THE INVENTION

Synergistic combinations of sweeteners including D-tagatose can be obtained by using about 0.01 to about 5.0% (w/v), preferably from about 0.05 to 2% (w/v), and most preferably from about 0.1 to about 1% (w/v) of D-tagatose. It should be understood in this application, that the designation (w/v) means grams/100 ml. Thus, 5%

D-tagatose means 5.0 grams of D-tagatose in 100 ml. of the total composition in which it is used. The amount will depend on the desired level of both sweetness and other sensory characteristics including mouthfeel, aftertaste, and flavor.

The beneficial effects of this invention can be realized when D-tagatose is used in conjunction with one or more potent sweeteners. These potent sweeteners are well known in the art and are sometimes referred to as high intensity sweeteners. Potent sweeteners include cyclamate, saccharin, aspartame, acesulfame-K, neohesperidin dihydrochalcone, glycyrrhizin, rebaudioside, mogroside, monellin, thaumatin, alitame, neotame, stevioside and sucralose. Obviously, mixtures of potent sweeteners can be used in a wide variety of combinations. For example, a binary mixture of potent sweeteners could contain aspartame and acesulfame-K. A tertiary mixture of potent sweeteners could contain aspartame, acesulfame-K and cyclamate.

The desired weight ratio of D-tagatose to potent sweetener(s) will depend on the sweetener, and the sweetness and other characteristics desired in the final product. Potent sweeteners vary greatly in their potency, ranging from about 30×sucrose for cyclamate to about 8000×sucrose for neotame. In general, the weight ratio of D-tagatose to potent sweetener in the sweetener composition according to the present invention will range between 1:5 and 10,000:1, typically between 1:1 and 1000:1, and preferably between 4:1 and 200:1, depending on the particular potent sweetener (s) selected. Thus, if D-tagatose is blended with cyclamate, and D-tagatose was added to a beverage in an amount of 0.2% (w/v), approximately the same amount of cyclamate would be required to deliver an accceptable amount of sweetness. In this case, a ratio of 1:1 would be appropriate. If D-tagatose was combined with neotame in an amount of 1% (w/v) of the total composition, the concentration of neotame required for similar sweetness levels would be about 0.001%, or a ratio of 1000:1.

Other ratios that are suitable for other potent sweeteners within the scope of the present invention will be apparent to those skilled in the art. Taking acesulfame-K, for example, at about 150×sucrose, 0.05% D-tagatose may be combined with 0.05% acesulfame-K (1:1 ratio), or 5.0% D-tagatose may be combined with 0.01% acesulfame-K (500:1 ratio). For aspartame at about 200×sucrose, 0.05% D-tagatose may be combined with 0.04% aspartame (ratio of 1.25:1), or 5% D-tagatose with 0.01% aspartame (500:1 ratio). For sucralose at about 600×sucrose, 0.05% D-tagatose could be used with 0.02% sucralose (2.5:1 ratio) or 5% D-tagatose could be used with 0.005% sucralose (1000:1 ratio). For alitame at about 2000×sucrose, 0.05% D-tagatose would be combined with 0.005% alitame (10:1 ratio) or 5% D-tagatose would be combined with 0.0025% alitame ((2000:1) ratio. As is evident from these exemplary ratios, reducing the amount of D-tagatose from 5% generally will require the amount of potent sweetener to be increased.

Similarly, the amount of the components of the sweetener composition in an edible food product will vary depending on the potent sweetener used and the sweetness and other characteristics desired in the final product. In a typical beverage formulation, for example, at 5% D-tagatose, a concentration of about 5 ppm of potent sweeteners such as thaumatin, alitame or neotame would be suitable. If the potent sweetener were cyclamate, at 5% D-tagatose, the cyclamate would suitably be present at 500 ppm. With D-tagatose present at 0.1%, the concentrations of these potent sweeteners would be present at a concentration of about 10 ppm and 1,000 ppm respectively. Determination of appropriate concentrations to achieve results consistent with the teachings of this invention is within the skill of the art.

When D-tagatose is used in conjunction with one or more potent sweeteners, it has been observed that it is able to replace significant quantities of those other sweeteners, even when it is added at concentrations well below its measured sweet taste threshold. A surprising amount of potent sweetener saving is made possible by the use of D-tagatose, much more than would be expected given its sweetness intensity at the level of use.

A sweetener composition according to the present invention can be used with a great variety edible products including fruit, dairy products, a variety of beverages including juices and carbonated beverages, bakery products, confections, and the like. For example, it can be added to a beverage formulation to obtain the desired balance of sweetness and other sensory characteristics of the beverage. The use of D-tagatose in combination with a potent sweetener is particularly effective in improving the mouthfeel of a beverage. In using the sweetening composition according to the present invention, it may be incorporated in the edible food product to be sweetened in any appropriate manner. For example, it may be added directly to the product to be sweetened or it may be first combined with a diluent and then added to the product or any component of the ultimate product at any stage in the manufacturing process.

In order to demonstrate the synergistic effects and other benefits derived from the use of D-tagatose in combination with one or more potent sweeteners, several experiments were performed.

Experiment 1

The relative sweetness of D-tagatose relative to aspartame was determined according to the following procedure. A group of six panelists were presented with a range of aspartame standard and a randomly coded solution containing D-tagatose. The evaluations were carried out using water solutions, and each concentration of D-tagatose was tasted in duplicate. The following concentrations of D-tagatose were evaluated compared to aspartame.

| D-tagatose, % (w/v) | Sweetness Equivalent Aspartame, ppm |
|---|---|
| 0.00 | 0 |
| 0.20 | 17 |
| 0.40 | 21 |
| 0.60 | 28 |
| 0.80 | 38 |
| 1.0 | 43 |

Experiment 2

As will be described below, the quantitative sweetness synergy that can be achieved by mixing D-tagatose with aspartame and a combination of aspartame and acesulfame-K mixtures was first estimated. These mixtures were then used in conjunction with typical beverage flavor systems (cola and lemon/lime) where, in addition to quantifying the sweetness synergy, determinations were made of the impact on product mouthfeel, flavor and aftertaste.

Materials used in this experiment, the procedures used, and the results obtained are reported below:

(i) Model Beverage System

The model system in which this Phase of the experiment was conducted is a simple citrate buffer formulated at pH 3.2. The formulation was as follows:

| | |
|---|---|
| Citric acid (anhydrous) | 0.14 g |
| Trisodium citrate | 0.04 g |
| Water | to 100 ml |

This model system was selected because of its relevance to beverage formulations, while not being subject to the sensory complications induced by added flavors.

(ii) Formulated Beverage Compositions (a) Lemon and Lime

| Ingredients | % (RTD = ready to drink) |
|---|---|
| Formulation | |
| Citric acid | 0.310 |
| Lemon/lime flavor | 0.085 |
| Sodium citrate | 0.031 |
| Sodium benzoate | 0.018 |
| Sweeteners | see below |
| Water | to 100% |
| Reference Sweetener Blends | |
| Aspartame | 550 ppm |
| Aspartame | 200 ppm |
| Acesulfame-K | 200 ppm |

(b) Cola

| Ingredients | % (RTD) |
|---|---|
| Formulation | |
| Cola flavor: | 0.340 |
| Phosphoric acid (85%) | 0.100 |
| Sodium citrate | 0.031 |
| Sodium benzoate | 0.018 |
| Citric acid | 0.018 |
| Sweeteners | see below |
| Water | to 100% |
| Reference Sweetener Blends | |
| Aspartame | 525 ppm |
| Aspartame | 600 ppm |
| Acesulfame-K | 50 ppm |

(iii) Sensory Procedures

The sensory procedures adopted in this experiment utilized panelists fully experienced in standard sensory evaluation procedures who had been screened for their sensory acuity and ability to rank different sweetener concentrations according to their relative sweetness intensities.

Equi-sweetness concentrations of all solutions were established using an established sweetness matching procedure. This procedure involved the sweetness intensity comparison of, for example, a reference 11% sucrose model soft drink buffer against that of a series of sweetener test solutions whose sweetener concentrations differed in a step-wise manner and the subsequent identification of that test product whose sweetness intensity matched precisely the sweetness of the reference solution. Evaluations were carried out in duplicate, with appropriate standard controls employed to eliminate such effects as adaptation, carry-over and order effects.

Qualitative effects of adding D-tagatose to near-market beverages were described by reference to the equi-sweet control beverages. Panelists were instructed to comment on any differences between reference and test products in sweetness impact, time-intensity profile, mouthfeel, aftertastes including bitterness, degree of lingering sweetness and overall taste quality and acceptability.

There are no generally accepted sensory methods designed to qualify 'mouthfeel'. However, the following approach was adopted so as to derive an estimate of the impact of D-tagatose addition on the mouthfeel of 'diet' beverages.

Reference cola and lemon/lime beverages sweetened with sucrose (11%; w/v) and sodium saccharin (0.040%; w/v) were accorded mouthfeel intensity scores of 10 and 1, respectively. Panelists were then instructed to score the mouthfeel of test beverages relative to these reference beverages. Mouthfeel values recorded represent the average scores of all panelists.

(iv) Sweetener Concentrations

The concentrations of the following sweeteners equi-sweet to 11% sucrose in the model beverage system were established:

aspartame;
aspartame:acesulfame-K (1:1);
aspartame:acesulfame-K (2:1);
aspartame:acesulfame-K (12:1);

Sucrose at 11% was used as reference standard due to it being a general average sweetness equivalence for North American beverages.

D-Tagatose was added at 0.2%, 0.5%, 1.0% and 1.5%, while simultaneously reducing the concentration of the low-calorie sweeteners so that equi-sweetness was maintained. These concentrations were selected so as to span the likely maximum use level.

These findings were then applied to fully formulated beverages prepared to be close appropriations of commercial beverage products. Cola and lemon/lime carbonated beverage formulations were developed and sweetened with market relevant sweetening systems, as follows:

| | |
|---|---|
| Diet/Light Cola | Aspartame |
| | Aspartame: acesulfame-K |
| Diet/Light Lemon/Lime | Aspartame |
| | Aspartame: acesulfame-K |

The concentrations of D-tagatose identified from the model system study as inducing beneficial sweetness synergy and sweet taste quality effects were added and the level of potent sweetener adjusted to ensure equi-sweetness. The overall taste quality of the reference products and those which contained D-tagatose were compared.

The sensory impact of D-tagatose addition to the model system and formulated beverages is presented in the following Tables.

In Table 1, equi-sweet sweetener concentrations are presented. As the concentration of D-tagatose is increased, the amount of low-calorie sweetener needed to maintain equi-sweetness is reduced. The reduction is larger than expected from Experiment 1. It is noted, for example, that 0.2% D-tagatose is able to replace 50 ppm aspartame, where 17 ppm was expected, and 1% D-tagatose spares 170 ppm aspartame, where 43 was expected. Thus, it is clear that there is substantial synergy between D-tagatose and aspartame.

The performance of D-tagatose in fully formulated cola and lemon/lime beverages is presented in Table 2. Again, equi-sweet concentrations were determined following addition of 1.0% and 0.2% D-tagatose.

The sensory effects following D-tagatose addition to formulated beverages are described in Tables 3–6. Panelists evaluated the effects of two levels of D-tagatose on 'flavor', 'aftertaste' and 'mouthfeel' attributes.

TABLE 1

Model Soft Drink System: Blends Equisweet To 11% Sucrose

| Sweetener Blend Concentration | Concentration of D-Tagatose (%, w/v) | | | | |
|---|---|---|---|---|---|
| (ppm) | 0.0% | 0.2% | 0.5% | 1.0% | 1.5% |
| APM | 610 | 560 | 515 | 440 | 375 |
| APM:Ace-K 1:1 | 170:170 | 155:155 | 140:140 | 130:130 | 115:115 |
| APM:Ace-K 2:1 | 230:115 | 205:102.5 | 185:92.5 | 160:80 | 140:70 |
| APM:Ace-K 12:1 | 445:37.1 | 420:35.0 | 405:33.8 | 360:30 | 360:30 |

TABLE 2

Sweetness Synergy of Blends In Soft Drink Formulations

| Sweetener | Reference Concentration | Concentration of D-Tagatose | |
|---|---|---|---|
| Blend | (ppm) | 0.2% | 1.0% |
| A. Lemon/Lime | | | |
| APM | 550 | 506 | 395 |
| APM:Ace-K 1:1 | 200:200 | 182:182 | 153:153 |
| B. Cola | | | |
| APM | 525 | 483 | 375 |
| APM:Ace-K 12:1 | 600:50 | 564:47 | 526:43.8 |

TABLE 3

Sensory Evaluation of Aspartame Sweetened, Lemon/Lime Beverage

| Code | Concentration of D-Tagatose % | Flavor | Aftertaste | Mouthfeel | Mouthfeel Score |
|---|---|---|---|---|---|
| Reference | — | Sharp fresh flavor, slightly 'peely' in nature. | Slight bitterness in aftertaste. | Quite full. | 8 |
| | 0.2 | Fresher, cleaner flavor profile. More depth of Flavor. | Cleaner aftertaste with no bitterness. | Comparable to the reference. | 8 |
| | 1.0 | Fresher flavor profile. More acidic. | Very clean, no bitterness. | Warmer and fuller than the reference and fully sucrose sweetened product. | 12 |

TABLE 4

Sensory Evaluation of Aspartame: Acesulfame-K Sweetened Lemon/Lime Beverage

| Code | Concentration of D-Tagatose % | Flavor | Aftertaste | Mouthfeel | Mouthfeel Score |
|---|---|---|---|---|---|
| Reference | — | Sharp, oily flavor. | Lingering sweetness in aftertaste. Also bitter, drying and metallic. | Not as full as aspartame reference. | 5.5 |
| | 0.2 | Fresher, sharper and fuller flavored than reference. | Cleaner and less metallic aftertaste. | Fuller than the reference. | 7 |
| | 1.0 | More rounded, less peaky flavor profile. More acidic. | Still slightly bitter but the bitterness is more integrated into the flavor profile. | Fuller and warmer than the reference and fully sucrose sweetened product. | 11 |

TABLE 5

Sensory Evaluation of Aspartame Sweetened Cola Beverage

| Code | Concentration of D-Tagatose % | Flavor | Aftertaste | Mouthfeel | Mouthfeel Score |
|---|---|---|---|---|---|
| Reference | — | Sweet, phosphoric flavor. | Some lingering sweetness in aftertaste. | Acceptable. | 6.5 |
| | 0.2 | Flat flavored. More lemony than the reference. | Similar to reference. | Fuller than the reference. | 7.5 |
| | 1.0 | Sharper and spicier than the reference. | Similar to reference. | Fuller than the reference. | 8.5 |

TABLE 6

Sensory Evaluation of Aspartame: Acesulfame-K (12:1) Sweetened Cola Beverage

| Code | Concentration of D-Tagatose % | Flavor | Aftertaste | Mouthfeel | Mouthfeel Score |
|---|---|---|---|---|---|
| Reference | — | Very sweet. Fuller, spicier cola flavor than the aspartame reference. | Lingering sweetness in aftertaste. | Quite full, possibly due to the sweetness intensity. | 8 |
| | 0.2 | Sharper and more acidic. Less sickly sweet. More balanced flavor and sweetness. | Less lingering sweetness. Very slightly drying. | Fuller than the reference. | 10 |
| | 1.0 | More rounded and balanced flavor profile. | Cleaner aftertaste with less lingering sweetness. | Slightly more mouthfeel than the reference. | 8.5 |

On the basis of this experiment, it can be concluded that D-tagatose induces some remarkable sensory effects when blended with potent sweeteners. D-tagatose appears to enhance sweetness in a unique manner. Addition of levels as low as 1%, at which concentration D-tagatose is barely sweet, effect a 20–25% reduction in the concentration of aspartame needed to maintain unchanged the perceived sweetness levels in beverage formulations. Even the addition of 0.2% D-tagatose has been observed to permit an almost 10% reduction in the concentration level of aspartame. This cooperation appears to be unique since such low levels of additional sweetness induce such a significant effect on perceived sweetness levels.

In addition to sweetness, other benefits are derived from the use of D-tagatose. For example, at 0.2% addition to beverages, it generally exhibits a positive effect on product mouthfeel. Panelists consistently referred to the test product as having a mouthfeel perceived to be fuller than the equivalent reference beverage. Since absence of mouthfeel is generally considered to be a consequence of the use of potent sweeteners as substitutes for sucrose/high fructose syrups, it provides one way of addressing what has been considered a strong negative to consumers of diet or light beverages.

It has been found that D-tagatose, when added to 'diet' beverages at concentrations as low as 0.2% where this increase in soluble solids, by itself, is not sufficient to cause any perceived increase in mouthfeel, enhances the perceived mouthfeel and body of such diet beverages. This enhanced mouthfeel and body is thought to be due, at least in part, to the ability of D-tagatose to convert the overall taste profile of diet beverages closer to those of regular, full-calorie beverages in keeping with a sweetness profile closer to that of sucrose. Accordingly, the mouthfeel and body of a D-tagatose containing beverage is also closer to that of a sucrose sweetened beverage.

While the above embodiments of the present invention are illustrative, it can be readily appreciated that it would be possible to deviate from those embodiments of the present invention without departing from the spirit of the invention. As will be readily understood by those skilled in the art, the invention is capable of many modifications and improvements within the scope and spirit thereof. Accordingly, it will be understood that the invention is not to be limited by the specific embodiments but only by the scope of the appended claims.

We claim:

1. A beverage containing a sweetener composition comprising D-tagatose and at least one potent sweetener wherein the D-tagatose is present in an amount of from about 0.01% to about 1.0% (w/v) and wherein the weight ratio of D-tagatose to potent sweetener ranges from 1:5 to 10,000:1.

2. A beverage according to claim 1, wherein the weight ratio ranges from 1:1 to 1,000:1.

3. A beverage according to claim 1, wherein the weight ratio ranges from 4:1 to 200:1.

4. A beverage according to claim 1, wherein the potent sweetener is selected from the group consisting of aspartame, alitame, neotame, saccharin, acesulfame-K, cyclamate, neohesperidin dihydrochalcone, glycyrrhizin, rebandioside, mogroside, monellin, thaumatin, stevioside, sucralose and mixtures thereof.

5. A beverage according to claim 1, wherein the potent sweetener is aspartame.

6. A beverage according to claim 1, wherein the potent sweetener is acesulfame-K.

7. A beverage according to claim 1, where the potent sweetener is a mixture of aspartame and acesulfame-K.

8. A beverage according to claim 1 wherein D-tagatose is present in an amount of from about 0.1% to about 1% (w/v).

9. A beverage according to claim 1 wherein the sweetener composition contains from about 5 ppm to about 4,000 ppm potent sweetener.

10. A beverage according to claim 9, wherein the potent sweetener comprises aspartame.

* * * * *